Patented May 5, 1953

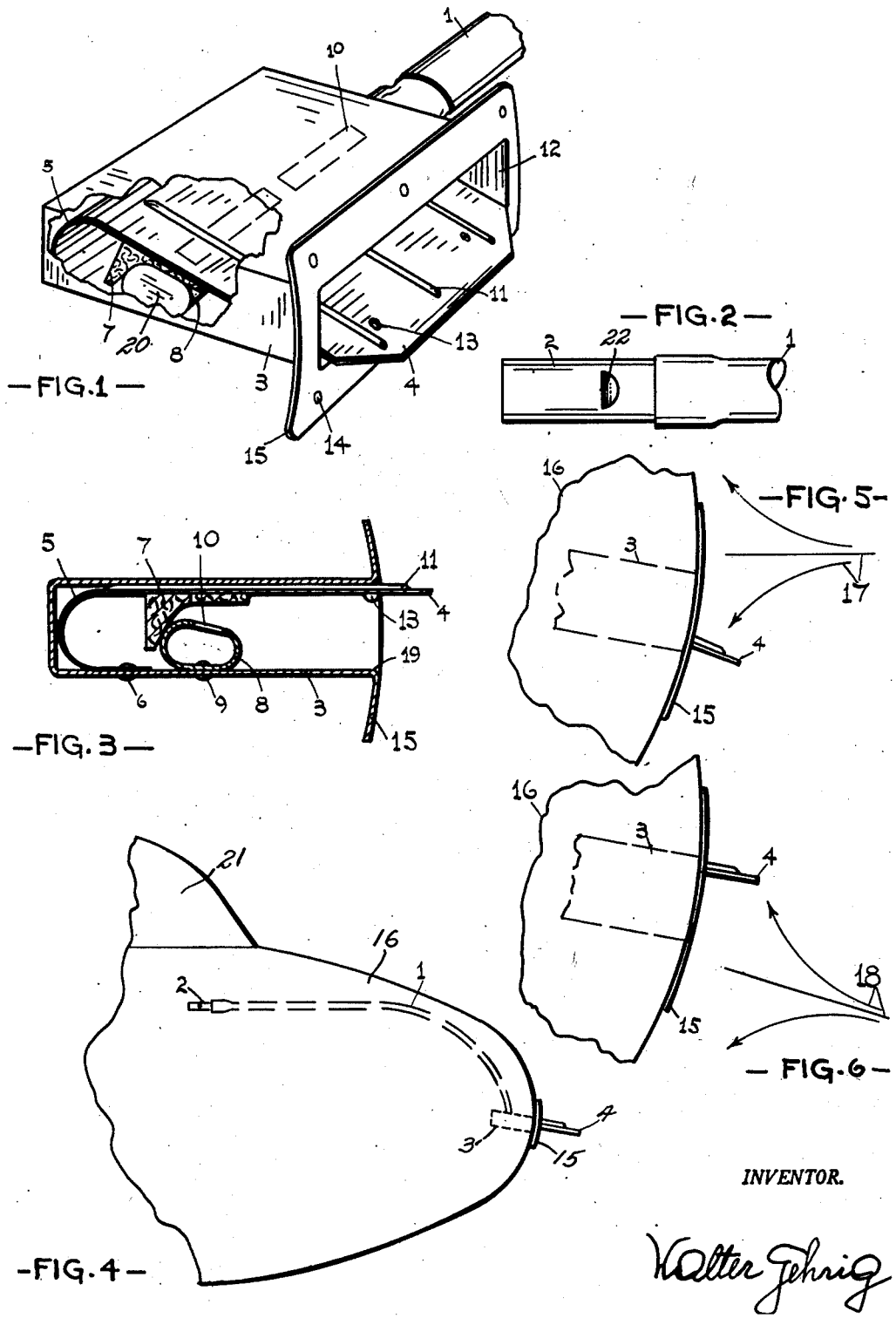

2,637,294

UNITED STATES PATENT OFFICE 2,637,294

ANGLE OF ATTACK INDICATOR

Walter Gehrig, Flint, Mich.

Application May 1, 1947, Serial No. 745,352

3 Claims. (Cl. 116—112)

The present invention relates to angle of attack governed apparatus for aircraft and is operated and controlled solely by air pressure induced by the airstream flowing about the aircraft in flight. Control means for an airflow actuated instrument comprises a conduit means opening to said airstream at one end thereof. A valve for said conduit controls the airflow therein. An unstable control vane is limitedly oscillatably mounted on said open conduit end which in turn is secured to an aircraft member. The oscillatable end of the control vane projects into the airstream in front of its pivot to open and close said valve when the airstream's angle of attack against said vane passes particular angles of attack. An airflow actuated instrument responsive to air pressure in said conduit may be designed to give a warning signal when said vane and valve are in "open" position. The described control means may also be used to control and actuate any other device in accordance with the airstream's angle of attack against the control vane.

On single engined tractor airplanes the control unit is preferably installed in the leading edge of a wing in order to be located outside the propeller slip-stream. On other types of aircraft the vane and valve unit may be mounted on the nose of the fuselage or on the leading end of a tube projecting forward into the undisturbed airstream.

For purpose of simple illustration the device is hereafter described as an angle of attack and stall warning indicator for airplanes. The airflow actuated instrument is represented by a whistle.

On airplanes, for every airfoil or wing there is a particular angle of attack at which the wing loses its required lift rapidly, frequently causing an accident. When the leading edge of an aircraft body, such as a wing, cuts through the air in flight, the air is divided at a certain air separation point, part of the deflected air flows up and over the wing and the rest flows down and under the wing. As the angle of attack of the airstream on the wing increases, the air separation point moves downward on the leading edge of the wing, what in turn results in a reversal of the direction of airflow in a zone on the leading edge upon passage of the air separation point. In my invention, I use this reversal of airflow to control signal means operated by the airstream when the aircraft is in flight.

The object of this invention is to provide an automatic angle of attack and stall warning indicator which is simple, reliable and low in cost.

A further object is to provide an angle of attack and stall warning indicator which does not require an electric power supply.

Another object is to provide an angle of attack and stall warning indicator which has few moving parts and contains no complicated or delicate mechanism.

A further object is to provide signalling means responsive to the airflow when the direction of air-flow reaches a high angle of attack relative to the aircraft.

Still another object is to provide valve means controlled by a vane to control an air-flow operated instrument.

A further object is to provide control means responsive to an aircraft's angle of attack for accordingly controlling any type of instrument by means of air pressure induced by the airstream.

These objects and several novel features of the invention are hereinafter more fully described and claimed and the preferred form of construction by which these objects are attained is shown in the accompanying drawing, in which:

Figure 1 is a perspective view of a vane and valve housing containing a valve and a vane adapted to open and close a conduit. The valve and vane are shown in closed position.

Figure 2 is a view of a whistle on the other end of the conduit.

Figure 3 is a section through said vane and valve housing, valve and vane. The valve and vane are shown in open position.

Figure 4 is a side view of the front end of an aircraft incorporating the provisions of the invention.

Figure 5 illustrates the air separation point in relation to the skin of the aircraft, and control vane, when the aircraft is in normal flight.

Figure 6 illustrates the air separation point on the same portion of the aircraft when same approaches a "stall."

The device comprises a hollow conduit 1 connecting an air-flow actuated warning instrument, such as a whistle 2, with a vane and valve housing 3 as shown in Figure 1. The vane and valve housing 3 encloses part of a resilient vane 4, the back-portion of which forms a U-shaped spring and pivot 5. The lower portion thereof is secured to the vane and valve housing 3 by means of rivets 6. The front end of the vane 4 projects from the elongated opening 12 in the convex face plate 15 and oscillates about the U-shaped spring 5. The top face of a hollow valve member 8 is formed to match the face of a resilient valve member 7, which is secured to the underside of the vane blade 4. Said hollow valve member 8 is provided with my inlet port 10 as shown in Figures 1 and 3. It is secured to the vane and valve housing by means of rivet 9 and traverses one side wall thereof to connect with a flexible conduit portion 1. One end of the tubular conduit and valve member 8 is closed by a plug 20. The vane and valve housing is secured to the aircraft 16 by means of screws (not shown) through the holes 14 in the face plate 15.

The described valve housing, valve and vane is mounted to the aircraft in such a location and angle so that the air-flow forces the vane downwards in normal flight and forces the vane upward when the aircraft approaches a "stall." The line and arrows 17 in Figure 5 indicate the air separation point and direction of air flow over the skin of the aircraft in normal flight. The air pressure against the top face of the vane 4 closes the valve ports 10 and thus seals the only openings on the valve-end of the conduit. The whistle 2 on the other end of the conduit is therefore silent when the aircraft is in normal flight. The line and arrows 18 in Figure 6 indicate the air separation point and direction of air flow when the air-stream reaches a high angle of attack relative to the aircraft, as when it approaches a "stall." As shown, the direction of air-flow over the vane 4 is now reversed and the vane is consequently forced upward into open position as shown in Figure 3. The valve ports 10 are now uncovered and as the opening 12 faces the air-stream the consequent air pressure in the vane and valve housing forces the air through the conduit 1 and out through the exhaust port 22 and causes the whistle 2 to sound a warning signal in the crew-quarters 21 of the aircraft.

The spring pressure of the U-shaped portion 5 of the vane 4 keeps the valve closed when the aircraft is on the ground and so prevents dust and insects from entering into the conduit 1. When the vane 4 is in closed position there is a slight opening between the lower face of the vane 4 and the lower front corner 19 of the vane and valve housing. Pimples 13 projecting from the lower face of the vane are the only points in contact with the lower front corner 19 of the vane and valve housing when the vane 4 is pressed downwards in flight. This prevents frost and slight icing from freezing the two parts together along the full width of the vane. When the vane is in open position as shown in Figure 3 the portion of the vane in contact with the upper wall of the vane and valve housing is limited to the top of the beads 11 which project from the top face of the vane as shown in Figures 1 and 3. The beads 11 also serve to stiffen the flat portion of the vane 4.

While in the present description of the invention a whistle is used as the signalling means, I do not limit myself to this form of instrument. Any other air-flow actuated instrument may be used in its place. Various other changes and modifications may be made therein without departing from the spirit or scope of my invention.

What I claim is:

1. An angle of attack indicator for use on an aircraft in flight comprising a conduit means, a vane and valve housing normally secured to the leading end of an aircraft member forming one end of said conduit means, an opening in said housing facing the airstream during flight, the other end of said conduit means terminating in an airflow operated signal means, a control vane oscillatably mounted in said housing projecting through said opening in said housing to within the airstream flowing about said aircraft in flight, a valve in said housing to control the airflow in said conduit means comprising a valve-port in fluid connection with the interior of said housing when open, a valve member operatively coupled with said control vane adapted to open and close said valve-port upon oscillating with said control vane between an open and a closed valve position in accordance with the airstream's angle of attack against said control vane, the airflow in said conduit means induced by said airstream at said opening in the vane and valve housing and controlled by said vane and valve.

2. Control means for an angle of attack governed aircraft apparatus comprising a conduit means, a vane and valve housing normally secured to the leading end of an aircraft member forming one end of said conduit means, an opening in said housing facing the airstream during flight, a control vane oscillatably mounted in said housing projecting through said opening in said housing to within the airstream flowing about said aircraft in flight, a valve in said housing to control the airflow in said conduit means comprising a valve-port in fluid connection with the interior of said housing when open, a valve member operatively coupled with said control vane adapted to open and close said valve port upon oscillating with said control vane between an open and a closed valve position in accordance with the airstream's angle of attack against said control vane, the airflow in said conduit means induced by said airstream at said opening in the vane and valve housing and controlled by said vane and valve.

3. Control means for an angle of attack governed aircraft apparatus comprising a conduit means having one end opening toward the airstream flowing about the aircraft during flight, a vane pivotally mounted inside said conduit means projecting from said conduit opening to within said airstream, a valve disposed on said conduit means adjacent the leading end thereof comprising a conduit-port in fluid connection with said airstream when open, a valve member coupled with said vane adapted to open and close said conduit-port upon oscillating with said vane between an open and closed valve position in accordance with the airstream's angle of attack against said vane whereby the airflow through said conduit-port is controlled, a resilient spring associated with said vane holding the coupled valve-member in valve shut position when the aircraft is not in flight.

WALTER GEHRIG.

References Cited in the file of this patent

UNITED STATES PATENTS

| Number | Name | Date |
| --- | --- | --- |
| 2,110,730 | Holland, Jr. | Nov. 6, 1936 |
| 2,287,497 | Rockefeller | June 23, 1942 |
| 2,478,967 | Greene | Aug. 16, 1949 |
| 2,486,779 | Fairbanks | Nov. 1, 1949 |
| 2,499,284 | Smith | Feb. 28, 1950 |